(12) United States Patent
Akhtar et al.

(10) Patent No.: US 6,598,335 B2
(45) Date of Patent: Jul. 29, 2003

(54) OBJECT CATCHER

(76) Inventors: Michael Akhtar, 22700 30th Ave. South, A-107, Des Moines, WA (US) 98198-7242; Usha Kiran, 22700 30th Ave. South, A-107, Des Moines, WA (US) 98198-7242

( * ) Notice: Subject to any disclaimer, the term of this patent is extended or adjusted under 35 U.S.C. 154(b) by 0 days.

(21) Appl. No.: 09/923,666

(22) Filed: Aug. 6, 2001

(65) Prior Publication Data

US 2002/0194772 A1 Dec. 26, 2002

Related U.S. Application Data

(60) Provisional application No. 60/223,415, filed on Aug. 7, 2000.

(51) Int. Cl.$^7$ .............................................. A01K 77/00
(52) U.S. Cl. .......................................................... 43/12
(58) Field of Search ......................... 43/7, 11, 12, 105, 43/133, 134; 119/802–804

(56) References Cited

U.S. PATENT DOCUMENTS

| | | | | |
|---|---|---|---|---|
| 878,529 A | * | 2/1908 | Holmes | 43/12 |
| 959,555 A | * | 5/1910 | Koberstein | 43/12 |
| 1,340,874 A | * | 5/1920 | Brown | 43/12 |
| 1,742,550 A | * | 1/1930 | Mann | 43/12 |
| 2,115,082 A | * | 4/1938 | Phillips | 43/12 |
| 2,124,952 A | * | 7/1938 | Norris et al. | 43/12 |
| 2,197,921 A | * | 4/1940 | Brown | 43/12 |
| 2,486,233 A | * | 10/1949 | Wallingford | 43/12 |
| 2,510,186 A | * | 6/1950 | Marsico et al. | 43/11 |
| 2,522,533 A | * | 9/1950 | Nankeman | 119/802 |
| 2,727,328 A | * | 12/1955 | Dunton | 43/12 |
| 3,224,131 A | * | 12/1965 | Parse | 43/12 |
| 4,031,650 A | * | 6/1977 | Popeil | 43/12 |
| 4,446,646 A | | 5/1984 | van't Veld | |
| 4,776,129 A | * | 10/1988 | Kelly | 43/133 |
| 5,157,854 A | * | 10/1992 | Rumsey, Jr. | 43/12 |
| 5,479,739 A | | 1/1996 | Livingston | |
| 5,778,826 A | * | 7/1998 | Dillon et al. | 119/802 |
| 6,003,262 A | | 12/1999 | Beaty | |
| 6,260,302 B1 | | 7/2001 | Blaschke | |
| 6,446,378 B1 | * | 9/2002 | Welch et al. | 43/12 |

FOREIGN PATENT DOCUMENTS

| | | | | |
|---|---|---|---|---|
| DE | 19910067 B1 | * | 9/2000 | |
| FR | 920427 B1 | * | 4/1947 | 43/12 |
| GB | 10729 B1 | * | of 1888 | 43/12 |
| GB | 1533695 B1 | * | 11/1978 | |
| GB | 2192321 B1 | * | 1/1988 | |
| JP | 10-234285 B1 | * | 9/1998 | |
| WO | WO-85/01859 B1 | * | 5/1985 | |

OTHER PUBLICATIONS

International Search Report for PCT/US01/41599.

* cited by examiner

Primary Examiner—Darren W. Ark
(74) Attorney, Agent, or Firm—Christensen O'Connor Johnson Kindness PLLC

(57) ABSTRACT

The present invention provides an object catcher including a support shaft having a proximal end and a distal end, and a sheet portion arranged adjacent to the distal end of the support shaft. The sheet portion defines a periphery. The object catcher further includes a line having a first end portion and a second end portion and an intermediate portion between the first and second end portions. The intermediate portion of the line is slidably coupled to the periphery of the sheet portion, and the first and second end portions extend generally in parallel with the support shaft. With this construction, pulling the first and second end portions of the line in the direction from the distal end to the proximal end of the support shaft causes the periphery of the sheet portion to be gathered to thereby close the sheet portion.

6 Claims, 11 Drawing Sheets

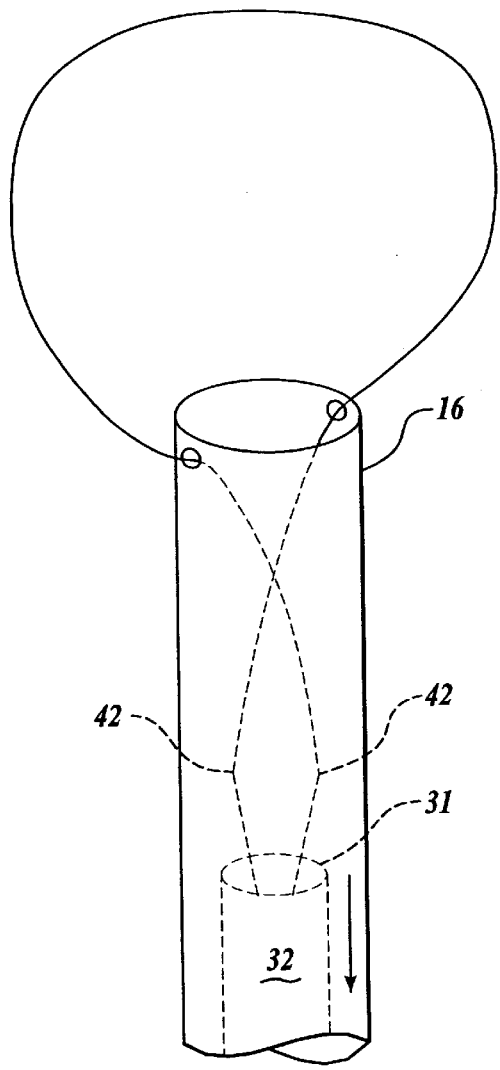
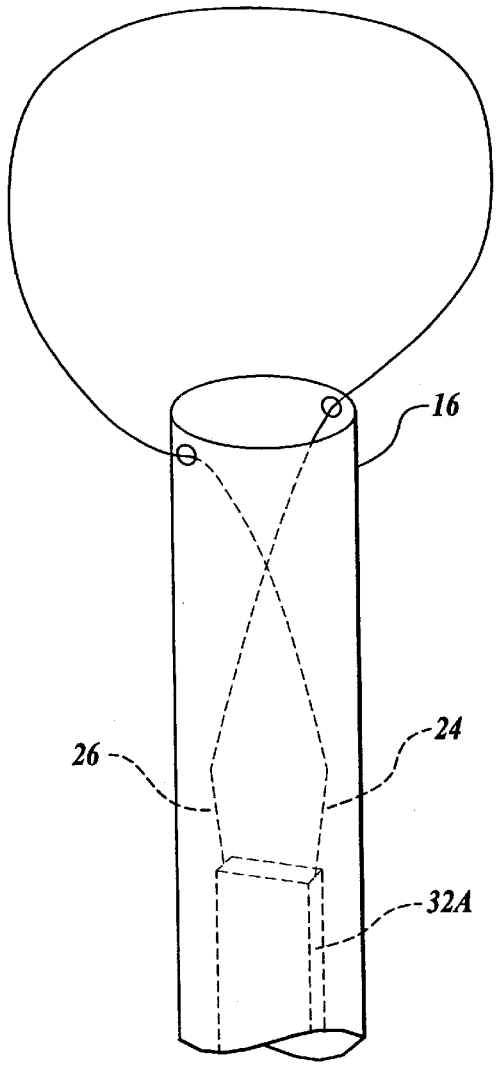
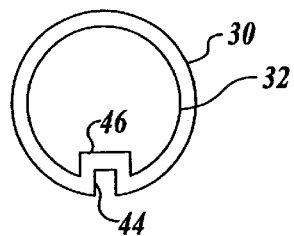
Fig. 2B  Fig. 3
Fig. 4

OBJECT CATCHER

CROSS-REFERENCE TO RELATED APPLICATION

This application claims the benefit under 35 U.S.C. §119 (e) of U.S. Provisional Application No. 60/223,415, filed Aug. 7, 2000.

FIELD OF THE INVENTION

The present invention is directed to an object catcher, and more specifically to an object catcher that is designed not to damage the object being captured.

BACKGROUND OF THE INVENTION

When catching flies or other insects to remove them from inside a house, people tend to swat them or otherwise kill them. Taking their innocent lives, however, are not necessary. Also, swatting flies or other insects normally leaves behind a smear on the surface where they were killed or hurt. Thus, it is desirable to have a catcher that can capture flies or other insects without necessarily hurting them.

SUMMARY OF THE INVENTION

The present invention provides an object catcher including a support shaft having a proximal end and a distal end, and a sheet portion arranged adjacent to the distal end of the support shaft. The sheet portion defines a periphery. The object catcher further includes a line having a first end portion and a second end portion and an intermediate portion between the first and second end portions. The intermediate portion of the line is slidably coupled to the periphery of the sheet portion, and the first and second end portions extend generally in parallel with the support shaft. With this construction, pulling the first and second end portions of the line in the direction from the distal end to the proximal end of the support shaft causes the periphery of the sheet portion to be gathered to thereby close the sheet portion.

In accordance with one aspect of the present invention, the support shaft is formed of a tube, and the first and second end portions of the line extend through the tube. The object catcher may further include a rod adapted to slide within the tube. The rod defines a distal end and a proximal end, and the first and second end portions of the line are secured to the distal end of the rod so that pulling the proximal end of the rod in the direction from the distal end to the proximal end of the support shaft causes the periphery of the sheet portion to be gathered to thereby close the sheet portion.

In accordance with another aspect of the present invention, the object catcher may include means for automatically opening or closing the sheet portion. For example, the object catcher may include spring-loaded means for automatically closing the sheet portion when actuated by a release button. As another example, the object catcher may include an electric motor for automatically opening or closing the sheet portion.

In accordance with yet another aspect of the present invention, the support shaft of the object catcher may include two or more telescopically coupled tubes. The support shaft constructed in this manner can be fully extended prior to opening the sheet portion to capture an object. Thereafter, the sheet portion is closed and then the support shaft is shortened to the original length.

Another embodiment of an object catcher of the present invention also includes a support shaft having a proximal end and a distal end, and a sheet portion defining a periphery and being arranged adjacent to the distal end of the support shaft. At least one line is slidably coupled to the periphery of the sheet portion. The object catcher further includes means for shortening a length of the line being adjacent to the periphery of the sheet portion so as to cause the periphery of the sheet portion to be gathered to thereby close the sheet portion.

Therefore, an object catcher of the present invention is highly suited for catching and removing insects from home without killing them or hurting them in any way. Further, the object catcher of the invention may be used in various other applications. For example, it may be used to catch fish, or it may be used to capture a golf ball fallen into water or otherwise hard-to-reach places. In fact, the object catcher may be used to catch any living or non-living objects, without hurting or damaging them, and therefore the applications of the object catcher of the present invention are substantially limitless.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A and 2B illustrate a line arrangement of the object catcher of FIGS. 1A and 1B, in an open position and a closed position, respectively;

FIG. 3 illustrates an alternative embodiment of a rod of the object catcher shown in FIGS. 2A and 2B, depicting a flat bar being coupled to a pair of lines;

FIG. 4 is a cross-sectional view of an alternative embodiment of a rod and a tube of the object catcher of FIGS. 1A and 1B, depicting that the rod is arranged not to axially rotate relative to the tube;

DETAILED DESCRIPTION OF THE PREFERRED EMBODIMENT

Figure 1A:
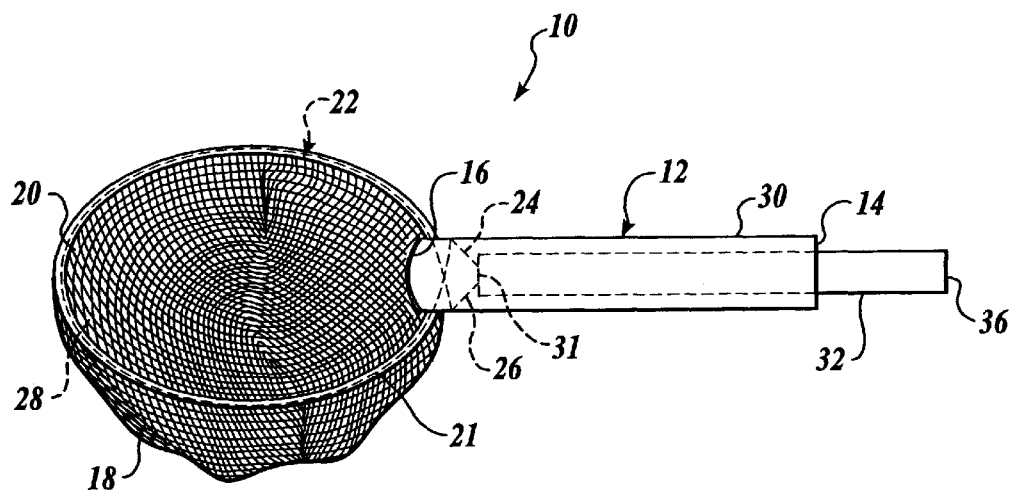
FIGS. 1A and 1B illustrate one embodiment of an object catcher of the present invention, in an open position and a closed position, respectively.
Figure 1B:
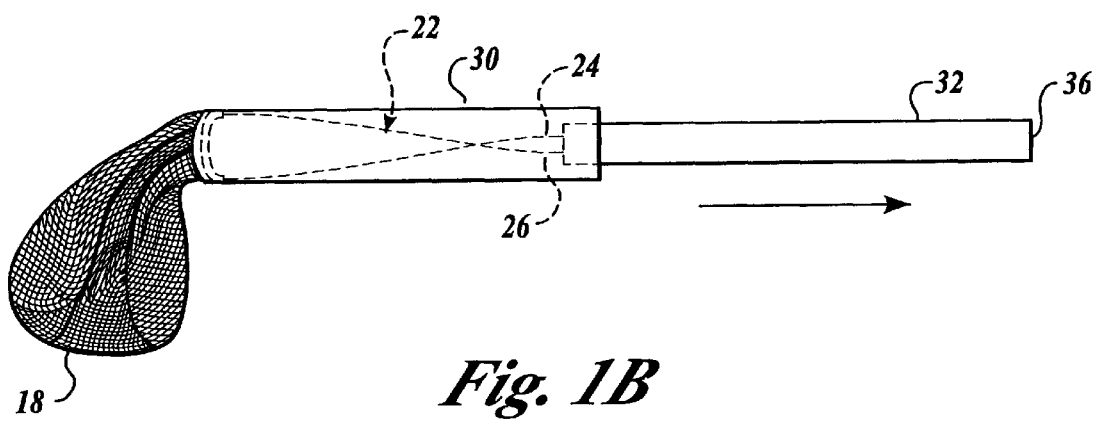

FIGS. 1A and 1B illustrate an object catcher 10 of the present invention, including a support shaft 12 having a proximal end 14 and a distal end 16. The object catcher 10 further includes a sheet portion 18 arranged adjacent to the distal end 16 of the support shaft 12. The sheet portion 18 defines a periphery 20. The object catcher 10 still further includes a line 22 having a first end portion 24, a second end portion 26, and an intermediate portion 28 between the first and second end portions 24 and 26. The intermediate portion 28 of the line 22 is slidably coupled to the periphery 20 of the sheet portion 18 and the first and second end portions 24 and 26 extend generally in parallel with the support shaft 12 so that pulling the first and second end portions 24 and 26 of the line 22 in the direction from the distal end 16 to the proximal end 14 of the support shaft 12 causes the periphery 20 of the sheet portion 18 to be gathered to thereby close the sheet portion 18, as illustrated in FIG. 1B.

In the illustrated embodiment, the support shaft 12 is formed of a tube 30 with two open ends, and the first and second end portions 24 and 26 of the line 22 generally extend within the tube 30. The first and second end portions 24 and 26 of the line 22 may further be secured to a distal end 31 of a rod 32, which is provided to slide within the tube 30. In this arrangement, pulling the proximal end 36 of the rod 32 in the direction from the distal end 16 to the proximal end 14 of the tube 30 causes the periphery 20 of the sheet portion 18 to be gathered to thereby close the sheet portion 18.

Therefore, in application, a user may simply apply the sheet portion 18 of the object catcher 10 over a bug, or other object to be captured, and pull the distal end 36 of the rod 32 until the sheet portion 18 is closed. The bug or other captured object is then contained within the closed sheet portion 18 without being damaged. To release the bug or other captured object, one may simply push the distal end 36 of the rod 32 in the direction from the proximal end 14 to the distal end 16 of the tube 30 to open the sheet portion 18.

The support shaft 12, specifically the tube 30, and the rod 32 may be made of any suitable, preferably light-weight, material, such as plastic. The sheet portion 18 is illustrated to be formed of mesh material, for example flexible mesh material or rigid steel mesh material, though it may be formed of non-mesh material also. It should be appreciated that the size and shape of the sheet portion 18 are not limited to what are illustrated in FIGS. 1A and 1B. Also, the sheet portion 18 may be formed of materials having varying rigidity or flexibility, depending on a particular application.

Figure 2A:
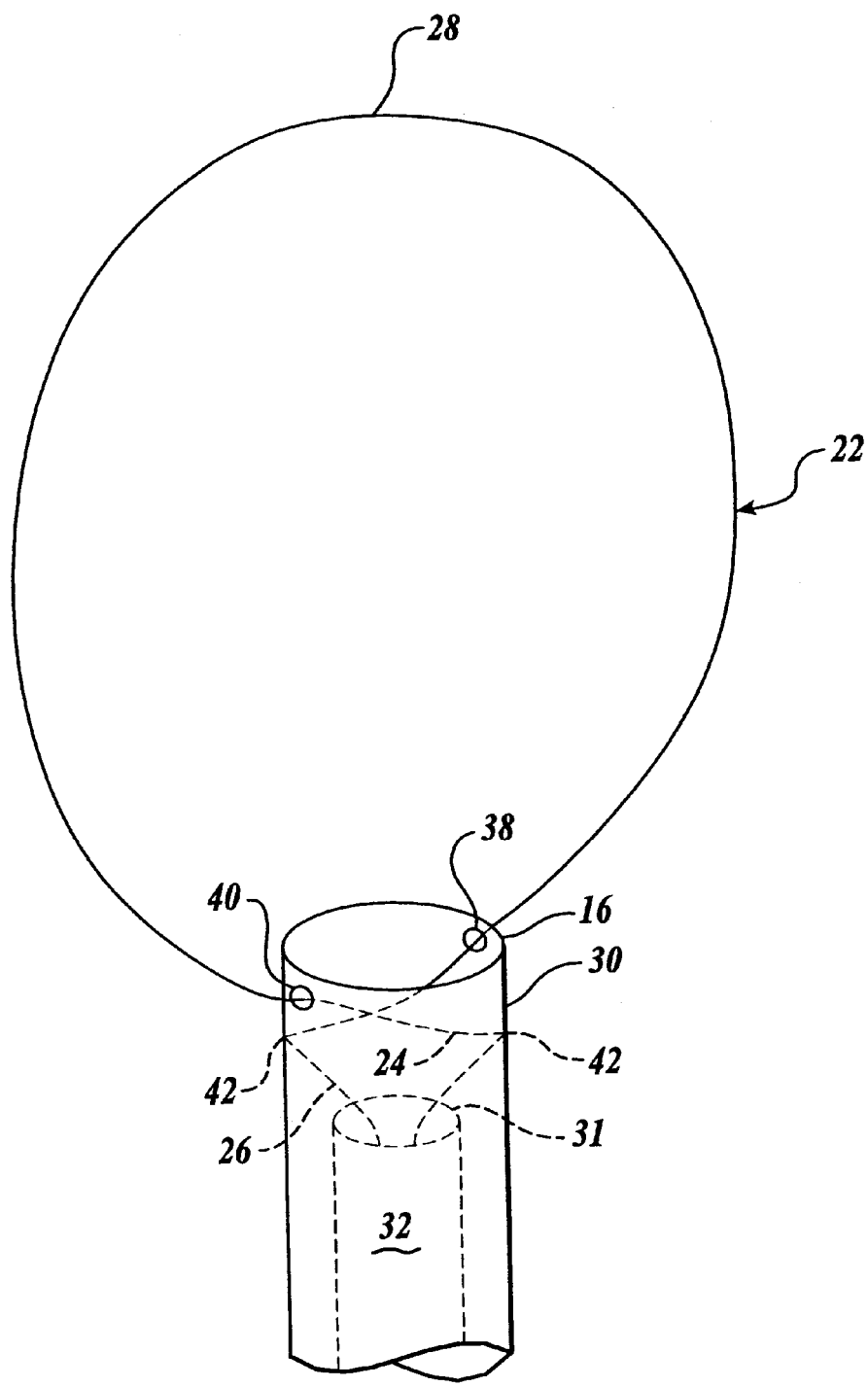

Referring to FIGS. 2A and 2B, the arrangement of the line 22 in the object catcher 10 of FIGS. 1A and 1B is described in detail. In the illustrated embodiment, the distal end 16 of the tube 30 defines two holes 38 and 40, through which the line 22 passes so that its first and second end portions 24 and 26 are received within the tube 30. The first and second end portions 24 and 26 are secured to the distal end 31 of the rod 32 using any suitable means, such as by adhesive. Referring additionally to FIG. 1A, the intermediate portion 28 of the line 22 slidably supports the periphery 20 of the sheet portion 18. To this end, a channel 21 may be formed along the periphery 20 of the sheet portion 18 so that the intermediate portion 28 of the line 22 can extend through the channel 21. The channel 21 may be formed, for example, by folding over a periphery edge of the sheet portion 18 radially inwardly and sewing together the periphery edge and the sheet portion 18. The line 22 is preferably formed of wire, but may be formed of other suitable materials such as plastic tubing, zip-tie cord, steel strip, etc. Referring back to FIGS. 2A and 2B, a portion 42 of each of the first and second end portions 24 and 26 of the line 22, formed of wire with memory, may be bent. This arrangement assists the intermediate portion 28 of the line 22 to generally "spring out" when opening the sheet portion 18. Specifically, when the sheet portion 18 is initially closed (as in FIG. 2B), to open the sheet portion 18, the rod 32 is pushed toward the distal end 16 of the tube 30. When the distal end 31 of the rod 32 nears the distal end 16 of the tube 30, the portions 42 of the first and second end portions 24 and 26, which were initially generally straight (see FIG. 2B), will return to their bent condition as shown in FIG. 2A, which in turn causes the intermediate portion 28 to generally spring out from the distal end 16 of the tube 30. This produces the effect that the sheet portion 18 generally pops open.

Figure 5A:
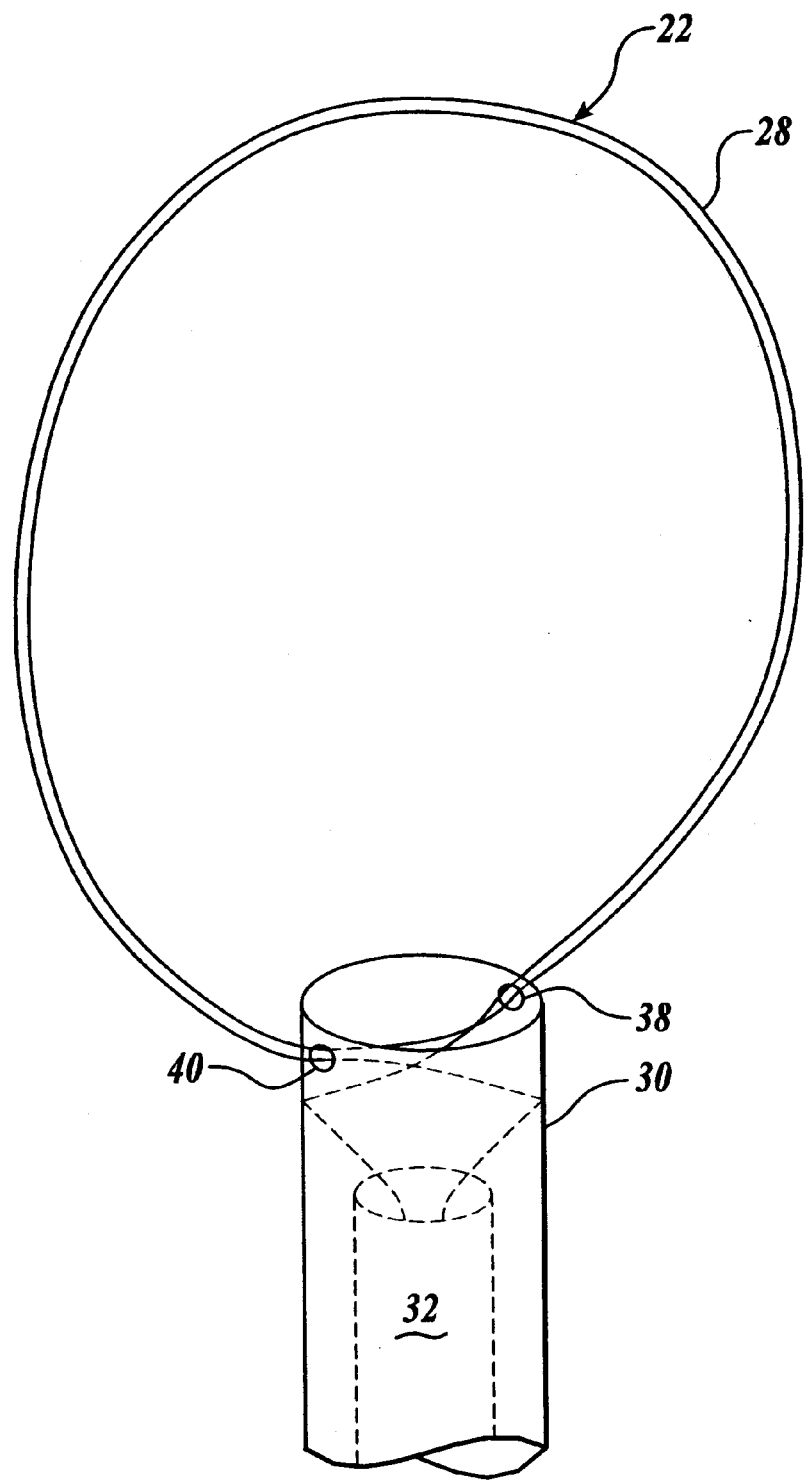
FIG. 5A illustrates an alternative line arrangement of the object catcher of FIG. 2A, wherein the line is doubled around a periphery of the sheet portion.
Figure 5B:
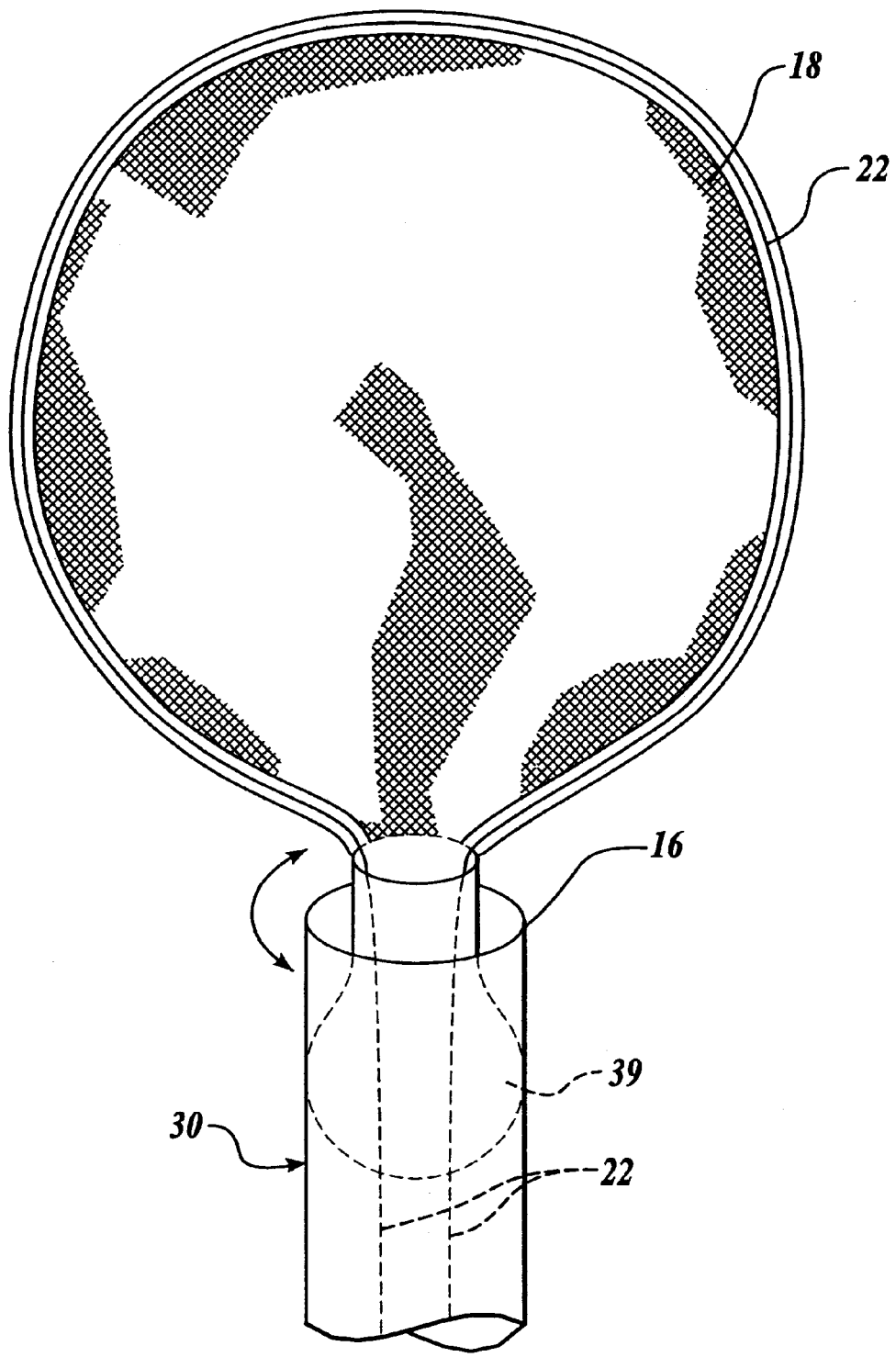
FIG. 5B illustrates an alternative embodiment of the object catcher of FIG. 2A, wherein a sheet portion is supported by a swivel joint coupled to the distal end of a support shaft.

Various alternative arrangements are possible. For example, Referring to FIG. 3, the generally cylindrical rod 32 may be replaced with a flat bar 32A extending through the tube 30. As illustrated, the first and second end portions 24 and 26 of the line 22 may be secured to both sides of the flat bar 32A. Referring to FIG. 4, to prevent the line 22 from being unnecessarily twisted and thus damaged, the rod 32 may be arranged such that it will not axially rotate within the tube 30. Specifically, the tube 30 may include a projection 44 extending radially inwardly therefrom, and the rod 32 may include a channel 46 for receiving the projection 44 therein. Various other configurations are possible to prevent axial rotation of the rod 32 relative to the tube 30, as will be apparent to those skilled in the art. Next referring to FIG. 5A, the intermediate portion 28 of the line 22 may doubly extend along the periphery 20 of the sheet portion 18. In this case, the line 22 extends through each of the holes 38 and 40 of the tube 30 twice, as illustrated. Still further, referring to FIG. 5B, the distal end 16 of the tube 30 may include a swivel joint (or ball joint) 39, through which the ends of the line 22 slidably extend. As before, pulling the ends of the line 22 toward the proximal end (not shown) of the tube 30 will cause the sheet portion 18 to close. The swivel joint 39 will allow the sheet portion 18 to be positioned at a varying angle relative to the tube 30.

Figure 6A:
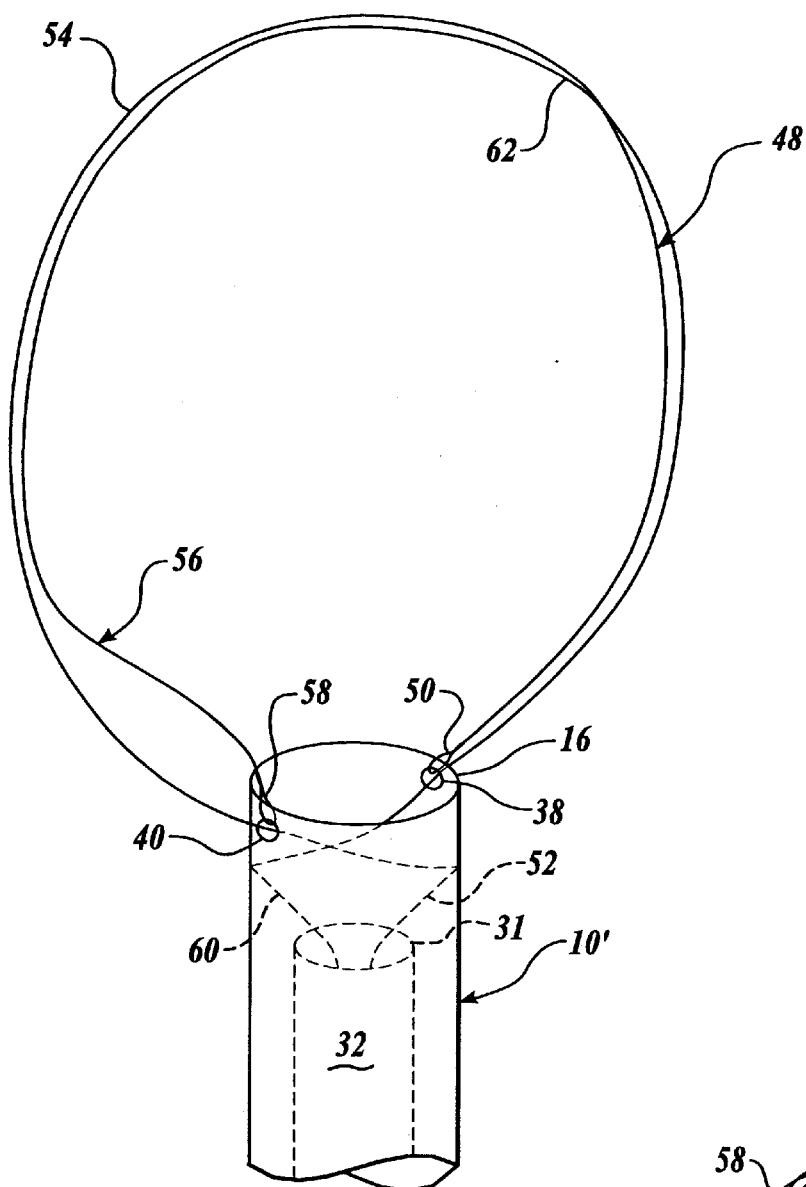
FIGS. 6A and 6B illustrate an alternative line arrangement of the object catcher of the present invention, in an open and a closed position, respectively.
Figure 6B:
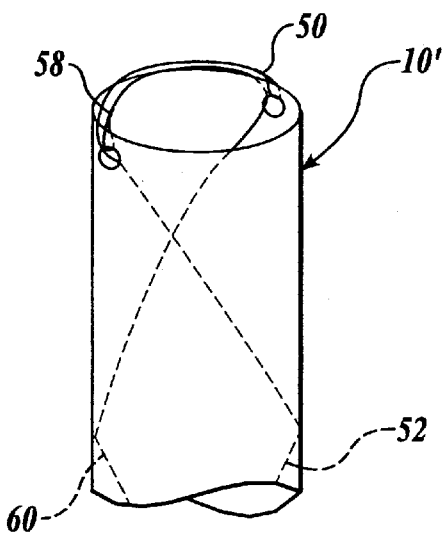

Referring now to FIGS. 6A and 6B, an alternative embodiment of the object catcher 10' of the present invention is described. This embodiment is generally the same as the object catcher 10 described above, except for its line arrangement. Specifically, this embodiment includes a first line 48 having a first end 50, a second end 52, and an intermediate portion 54; and a second line 56 having a first end 58, a second end 60, and an intermediate portion 62. The first ends 50 and 58 of the first and second lines 48 and 56, respectively, are secured to the distal end 16 of the tube 30. In the illustrated embodiment, the distal end 16 of the tube 30 defines two holes 38 and 40, as before, and the first ends 50 and 58 of the first and second lines 48 and 56 are hooked to the holes 38 and 40, respectively. Other methods of attachment are possible and will be obvious to those skilled in the art. One example would be to attach an eye at each of the first ends 50 and 58 of the first and second line 48 and 56, wherein the eye is larger in size than the size of the holes 38 and 40. As before, the intermediate portions 54 and 62 of the first and second lines 48 and 56, respectively, are slidably coupled to the periphery 20 of the sheet portion 18. The second ends 52 and 60 of the first and second lines 48 and 56, respectively, extend generally in parallel with the tube 30 so that pulling the second ends 52 and 60 in the direction from the distal end 16 to the proximal end 14 of the tube 30 causes the periphery 20 of the sheet portion 18 to be gathered to thereby close the sheet portion 18. As before, the second ends 52 and 60 of the first and second lines 54 and 62 may be secured to the distal end 31 of the rod 32, so that pushing and pulling the rod 32 will open and close the sheet portion 18, respectively.

Figure 7A:
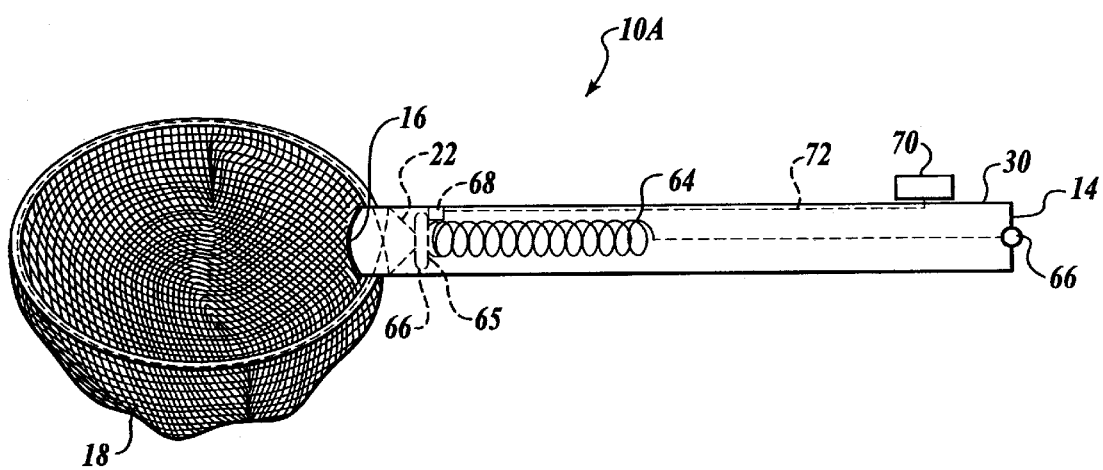
FIGS. 7A and 7B illustrate another embodiment of the object catcher of the present invention including an elastic element, in an open and a closed position, respectively.
Figure 7B:
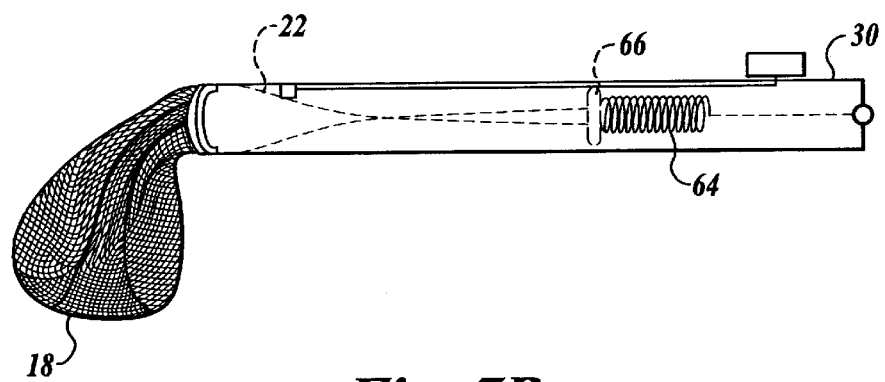

Pulling and pushing the line 22 (e.g., via the rod 32) to close and open the sheet portion 18 may be performed automatically. For example, referring to FIGS. 7A and 7B, the line 22 may be spring loaded so that a user can "pop open" the sheet portion 18 by pressing, sliding, or otherwise actuating a release button. Specifically, this embodiment of the object catcher 10A further includes an elastic element 64 housed within the tube 30. The elastic element 64 may be formed of a coiled spring, a bungee cord, etc. The elastic element 64 defines a distal end 65 and a proximal end 66. The distal end 65 of the elastic element 64 is secured to the end portions of the line 22, via a disk 66 in the illustrated embodiment. The proximal end 66 of the elastic element 64 is coupled to the proximal end 14 of the tube 30. The object catcher 10A further includes a latch 68 coupled to the tube 30 for engaging with the distal end 65 (or the disk 66 to which the distal end 65 is attached) of the elastic element 64 in a biased position, to thereby maintain the sheet portion 18 in an open position, as illustrated in FIG. 7A. The object catcher 10A still further includes a release element 70 coupled to the latch 68, via a cable 72 in the illustrated embodiment, and is accessible from outside the tube 30 for actuation. In operation, actuation of the release element 70 disengages the latch 68 from the distal end 65 of the elastic element 64 (or the disk 66 to which the distal end 65 is attached), to release the elastic element 64 to return to its non-biased position, as shown in FIG. 7B. This will close the sheet portion 18. Thus, the object catcher 10A of the present embodiment can be held and operated using one hand only.

Figure 8A:
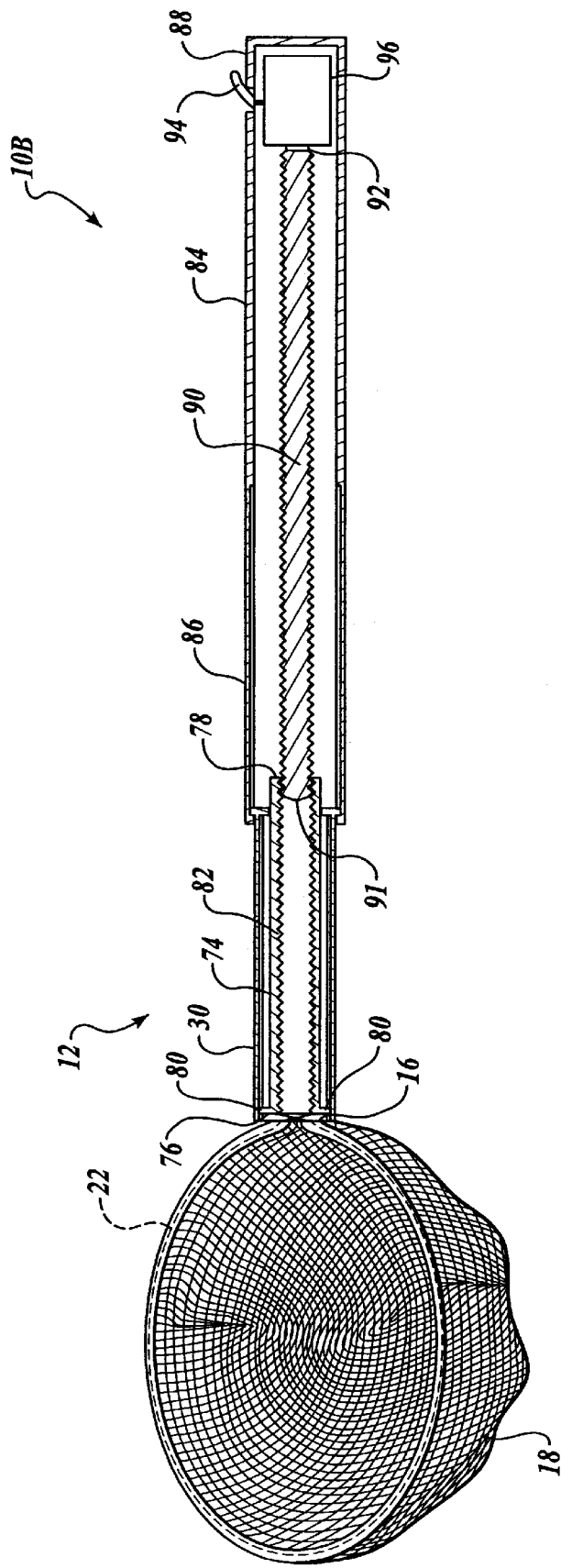
FIGS. 8A–8C illustrate yet another embodiment of the object catcher of the present invention including means for extending the length of a support shaft of the object catcher.

A further alternative embodiment of the object catcher is illustrated in FIG. 8A, which is adapted to freely extend the length of the support shaft of the object catcher. In this embodiment, the object catcher 10B includes a nut 74 coaxially housed within the tube 30. The nut 74 defines a distal end 76 and a proximal end 78, and is arranged to move along a length of the tube 30 without axially rotating relative to the tube 30. To this end, in the illustrated embodiment, the nut 74 includes a pair of projections 80 extending radially outwardly therefrom. The tube 30 defines a pair of corresponding channels (not shown) to respectively receive the projections 80, so that the nut 74 can slide along the channels along the tube 30 without axially rotating relative to the tube 30. Longitudinal ends of the channels define longitudinal limits of the movement of the projections 80 relative to the tube 30. Other arrangements for achieving the same result will be apparent to those skilled in the art.

The end portions of the line 22 are secured to the distal end 76 of the nut 74. The nut 74 defines an internally threaded surface 82 at least near its proximal end 78. The object catcher 10B still further includes a second tube 84 including a distal end 86 and a proximal end 88. The first tube 30 is telescopically coupled to the second tube 84 so as to selectively extend from the distal end 86 of the second tube 84. The object catcher 10B also includes an externally threaded rod 90 defining a distal end 91 and a proximal end 92. The distal end 91 of the rod 90 is threaded into the internally threaded surface 82 of the nut 74 via the proximal end 78 of the nut 74 so that rotating the externally threaded rod 90 in first and second directions will move the nut 74 toward and away from the distal end 16 of the first tube 30 to thereby open and close the sheet portion 18, respectively. The externally threaded rod 90 is generally housed within the second tube 84. Finally, the object catcher 10B includes an actuator 94 coupled to the proximal end 92 of the externally threaded rod 90 for rotating the rod 90 in the first and second directions. In the illustrated embodiment, the actuator 94 is formed of a switch accessible from outside the tube 84, and is coupled to an electric motor and battery, collectively referred to by reference number 96. In this embodiment, a support shaft is formed of the first tube 30 and the second tube 84.

Figure 8B:
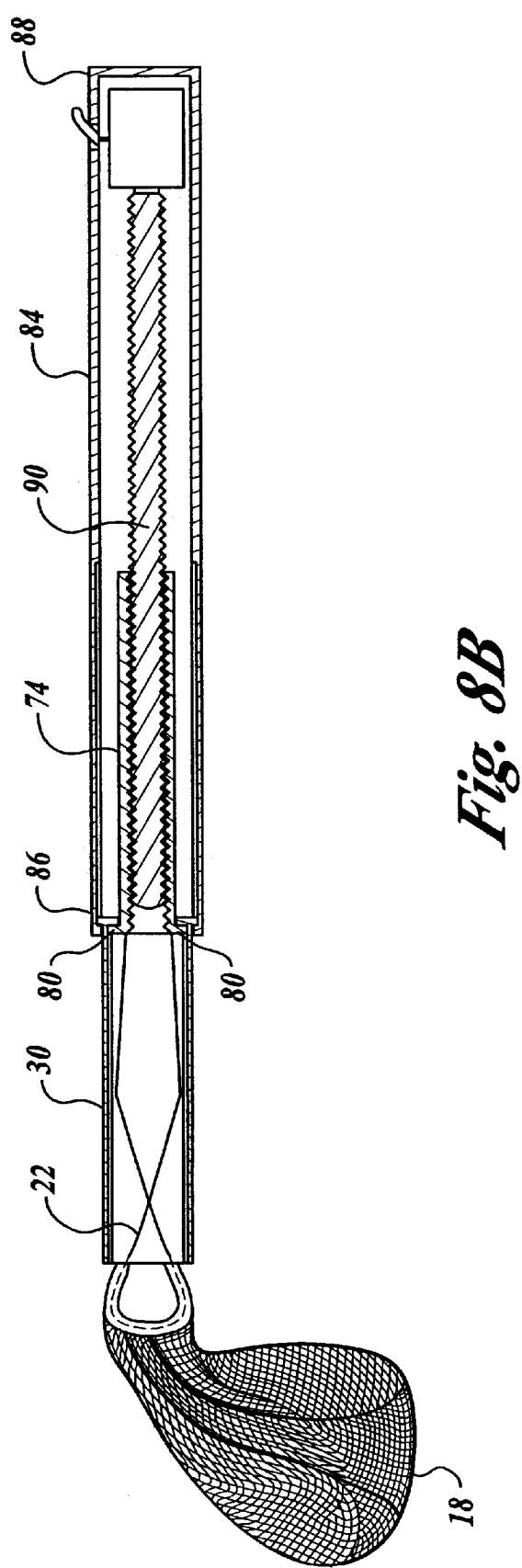
Figure 8C:
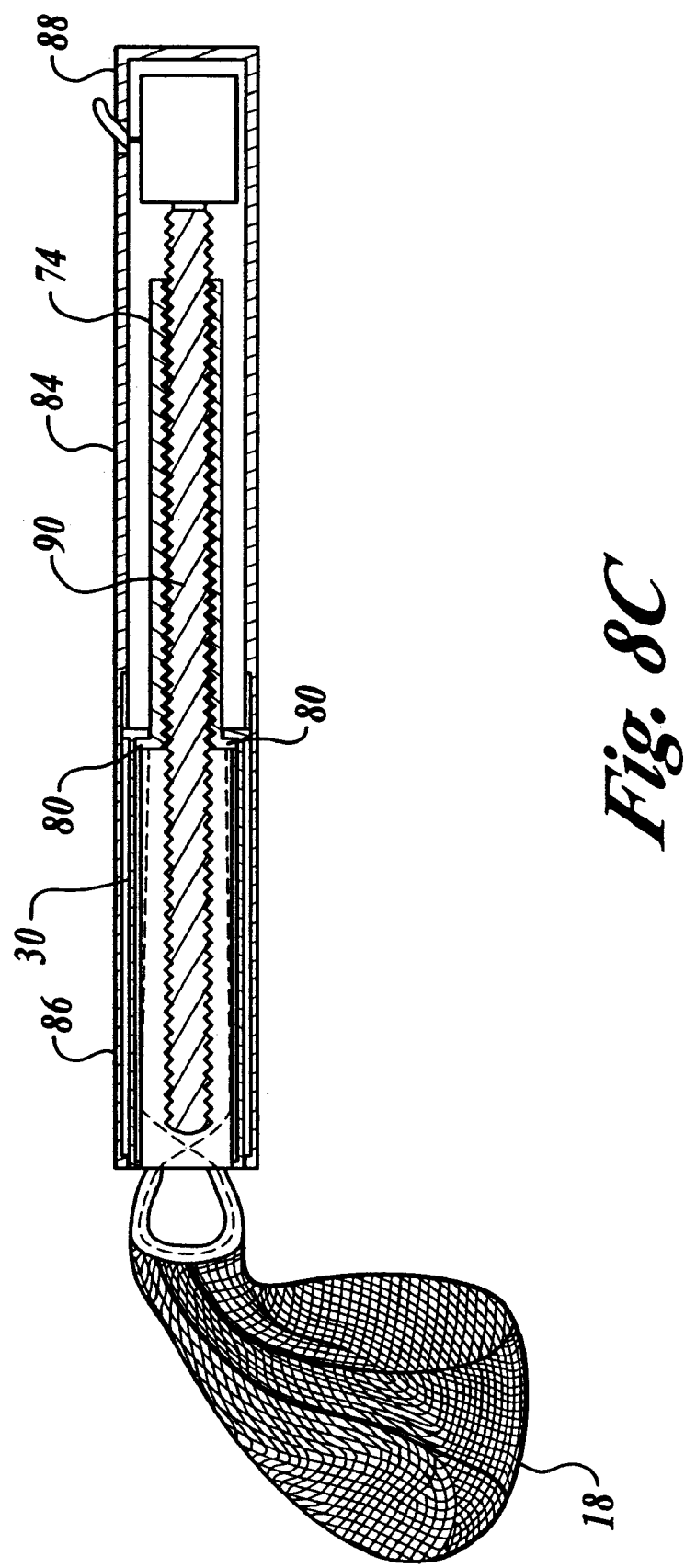

In operation, referring to FIG. 8B, to close the sheet portion 18, a user operates the switch 94 to activate the electric motor 96 to rotate the externally threaded rod 90 in a predefined direction. The rotation of the externally threaded rod 90 will cause an increasing portion of the distal end 91 of the rod 90 to be received within the nut 74, thereby moving the nut 74 in the direction from the distal end 86 to the proximal end 88 of the second tube 84. Since the end portions of the line 22 are secured to the distal end 76 of the nut 74, the movement of the nut 74 in turn closes the sheet portion 18. When the sheet portion 18 is closed, referring to FIG. 8C, any further rotation of the externally threaded rod 90 will continue moving the nut 74 in the same direction toward the proximal end 88 of the second tube 84. At the same time, since the nut 74 cannot mover further relative to the first tube 30 and the first tube 30 is telescopically coupled to the second tube 84, the rotation of the externally threaded rod 90 will cause the first tube 30 itself to start moving in the same direction toward the proximal end 88 of the second tube 84. This movement continues until the first tube 30 is fully received within the second tube 86. Thus, continued rotation of the externally threaded rod 90 in one direction will first close the sheet portion 18 (from FIG. 8A to FIG. 8B), and then retract the first tube 30 into the second tube 84 to thereby shorten the length of the support shaft 12 (from FIG. 8B to FIG. 8C). Likewise, continued rotation of the externally threaded rod 90 in the opposite direction will first extend the support shaft 12 by extending the first tube 30 out from the second tube 84 (from FIG. 8C to FIG. 8B), and then open the sheet portion 18 (from FIG. 8B to FIG. 8A). To further extend the support shaft, more than two tubes may be telescopically coupled.

Figure 9:
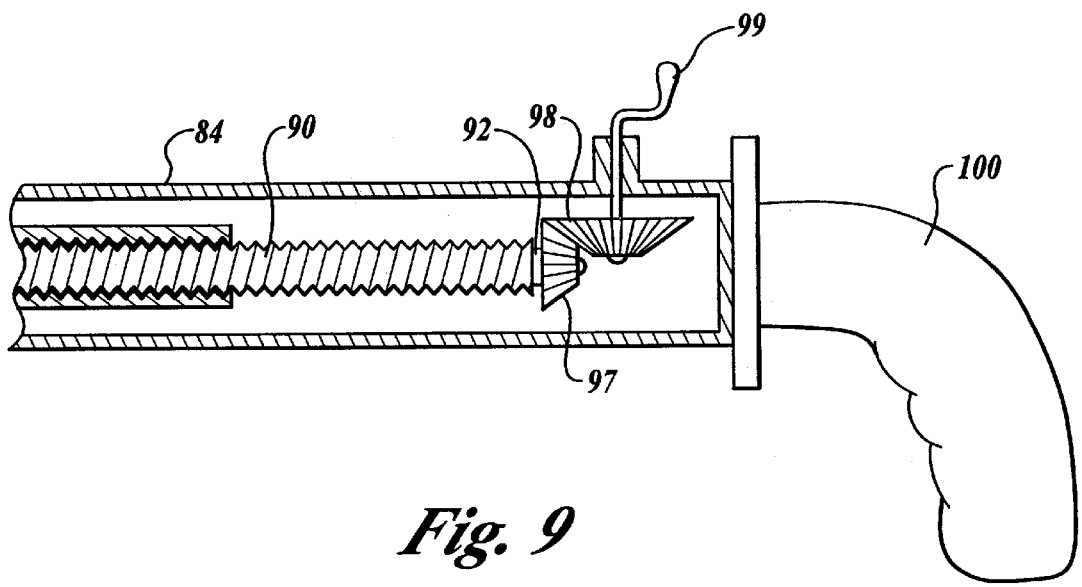
FIG. 9 illustrates a further alternative embodiment of the object catcher of FIGS. 8A–8C.

The actuator 94 may be configured in various manners. For example, referring to FIG. 9, the actuator 94 may include a pinion 97 secured to the proximal end 92 of the externally threaded rod 90; a crown wheel 98 coupled to the pinion 97; and a crank handle 99 extending from the crown wheel 98 for rotating the crown wheel. As illustrated, the crank handle 99 is accessible from outside the tube 84. Thus constructed, a user may use the crank handle 99 to rotate the crown wheel 98, which in turn will rotate the pinion 97 and hence the externally threaded rod 90. To allow a user to easily operate the crank handle 99, a main handle 100 may be attached to the proximal end 88 of the second tube 84. The user can then use his left hand, for example, to hold the main handle 100 while using his right hand to operate the crank handle 99.

Figure 10:
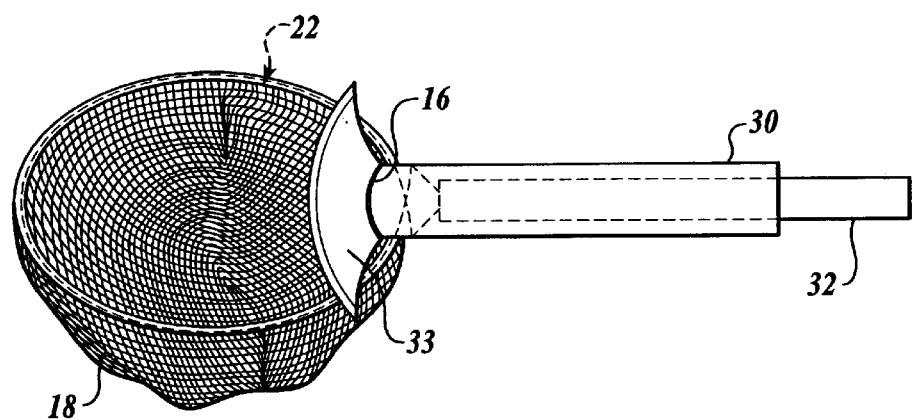
FIG. 10 illustrates an alternative embodiment of the object catcher of FIG. 1, including a blade.

FIG. 10 illustrates a still further alternative embodiment of the object catcher of the present invention. The object catcher of FIG. 10 is substantially similar to that of FIG. 1, except that it further includes a blade 33 connected to the distal end 16 of the tube 30. This embodiment may be useful in wrenching fruit, such as apples and grapes, off a tree. In operation, once a user applies the sheet portion 18 over a fruit and pulls the rod 32 to close the sheet portion 18, the line 22 will squeeze the stem of the fruit against the blade 33 to thereby sever the stem.

The overall length of the object catcher 10 may be about 5 feet for household use (for catching a bug, etc.) and may be extendable to about 7 to 10 feet for special applications (for retrieving a golf ball, etc.). Of course, the object catcher of the present invention may be made shorter or longer, depending on each application.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An object catcher comprising:

a support haft having a proximal end and a distal end, a sheet portion arranged adjacent to the distal end of the support shaft, the sheet portion defining a periphery; and a single line of one length having a first end portion and a second end portion and an intermediate portion between the first and second end portions, the intermediate portion of the line being slidably coupled to the periphery of the sheer portion and the first and second end portions extending in parallel with the support shaft so that pulling the first and second end portions of the line in the direction from the distal end to the proximal end of the support shaft causes the periphery of the sheet portion to be gathered to thereby close the sheet portion, wherein the intermediate portion of the line doubly extends along the periphery of the sheet portion by forming two continuous loops such that each loop circumscribes the periphery of the sheet portion.

2. The object catcher of claim 1, wherein the support shaft comprises a first tube and the first and second end portions of the line extend through the first tube.

3. The object catcher of claim 2, further comprising a rod adapted to slide within the first tube, the rod defining a distal end and a proximal end, and the first and second end portions of the line being secured to the distal end of the rod so that pulling the proximal end of the rod in the direction from the distal end to the proximal end of the support shaft causes the periphery of the sheet portion to be gathered to thereby close the sheet portion.

4. The object catcher of claim 1, wherein the periphery of the sheet portion defines a channel through which the intermediate portion of the line extends.

5. The object catcher of claim 1, wherein the sheet portion is formed of a mesh material.

6. The object catcher of claim 1, wherein the line comprises a wire.

* * * * *

UNITED STATES PATENT AND TRADEMARK OFFICE
CERTIFICATE OF CORRECTION

PATENT NO.    : 6,598,335 B2
DATED         : July 29, 2003
INVENTOR(S)   : M. Akhtar et al.

It is certified that error appears in the above-identified patent and that said Letters Patent is hereby corrected as shown below:

<u>Title page,</u>
Item [56], References Cited, FOREIGN PATENT DOCUMENTS,
"GB 10729 B1 * of 1888" should read
-- GB 10729 B1 * 7/1888 --

<u>Column 7,</u>
Line 8, "haft" should read -- shaft --
Line 8, "distal end," should read -- distal end; --
Line 17, "sheer" should read -- sheet --

Signed and Sealed this

Second Day of December, 2003

JAMES E. ROGAN
*Director of the United States Patent and Trademark Office*